United States Patent
Ackermann et al.

(10) Patent No.: US 12,139,351 B2
(45) Date of Patent: Nov. 12, 2024

(54) METHOD OF MOVING A STACK OF PRODUCTS USING A ROBOT

(71) Applicant: Heidelberger Druckmaschinen AG, Heidelberg (DE)

(72) Inventors: Herbert Ackermann, Ludwigsburg (DE); Udo Ganter, Freiberg am Neckar (DE); Martin Haupt-Terlau, Erdmannhausen (DE); Joachim Krumma, Pleidelsheim (DE); Gerhard Lubberger, Steinheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 926 days.

(21) Appl. No.: 17/171,006

(22) Filed: Feb. 9, 2021

(65) Prior Publication Data
US 2021/0245970 A1    Aug. 12, 2021

(30) Foreign Application Priority Data
Feb. 11, 2020  (DE) .......................... 102020103402.4

(51) Int. Cl.
   *B65G 47/90*    (2006.01)
(52) U.S. Cl.
   CPC ........... *B65G 47/90* (2013.01); *B65G 47/905* (2013.01)
(58) Field of Classification Search
   CPC ...... B65G 47/90; B65G 47/905; B65G 61/00; B65H 2405/581; B65H 31/3045; B25J 15/0253
   See application file for complete search history.

(56) References Cited

U.S. PATENT DOCUMENTS

| | | | |
|---|---|---|---|
| 5,193,973 A | 3/1993 | Tuebke | |
| 7,607,882 B2 | 10/2009 | Matalevich et al. | |
| 8,777,552 B2 * | 7/2014 | Ward | B65G 57/00 414/736 |
| 2004/0240979 A1 | 12/2004 | Beavers et al. | |
| 2006/0263196 A1 | 11/2006 | Kietzmann | |
| 2008/0175702 A1 | 7/2008 | Kietzmann | |

(Continued)

FOREIGN PATENT DOCUMENTS

| | | | | |
|---|---|---|---|---|
| DE | 202019106975 U1 | 2/2020 | | |
| EP | 1645434 B1 | 7/2008 | | |
| EP | 2072430 A1 * | 6/2009 | ............. | B65G 47/90 |

(Continued)

OTHER PUBLICATIONS

English translation of EP 3318371 (Year: 2018).*

(Continued)

*Primary Examiner* — Jacob S. Scott
*Assistant Examiner* — Erin Morris
(74) *Attorney, Agent, or Firm* — Laurence A. Greenberg; Werner H. Stemer; Ralph E. Locher

(57) ABSTRACT

A stack of products is moved using a robot. The robot has an articulated arm and grippers on the articulated arm to grip the stack of products. The stack of products is selectively turned in the depositing scheme. Two grippers are used in the method and, upon the deposit, the grippers are removed from the stack of products in the horizontal and in two directions perpendicular to one another. It is possible to move and selectively deposit stacks of product in a turned or unturned orientation.

8 Claims, 13 Drawing Sheets

(56) References Cited

U.S. PATENT DOCUMENTS

2017/0081134 A1\* 3/2017 Aldazabal Badiola ...................... B65G 57/00
2020/0354167 A1\* 11/2020 Koenig .................. B65H 45/04

FOREIGN PATENT DOCUMENTS

| EP | 2128056 A1 | 12/2009 | |
|----|------------|---------|---|
| EP | 2128057 A1 \* | 12/2009 | ............... B65H 3/50 |
| EP | 1383698 B1 \* | 10/2010 | ............. B65H 15/02 |
| EP | 3318371 A1 \* | 5/2018 | .......... B25J 15/0014 |
| FR | 3110152 A1 \* | 11/2021 | |
| JP | S6048848 A | 3/1985 | |
| WO | WO-9947439 A1 \* | 9/1999 | ............. B65G 47/90 |

OTHER PUBLICATIONS

"CoBo-Stack", MBO Maschinenbau Oppenweiler Binder GmbH & Co. KG: , Sep. 2019_v4. 2019. URL: https:/1 www.mbo- folder. com/download.php? file=ec5e06976dd305eb6ae20e d1647997ae, retrieved on Apr. 8, 2020.

\* cited by examiner

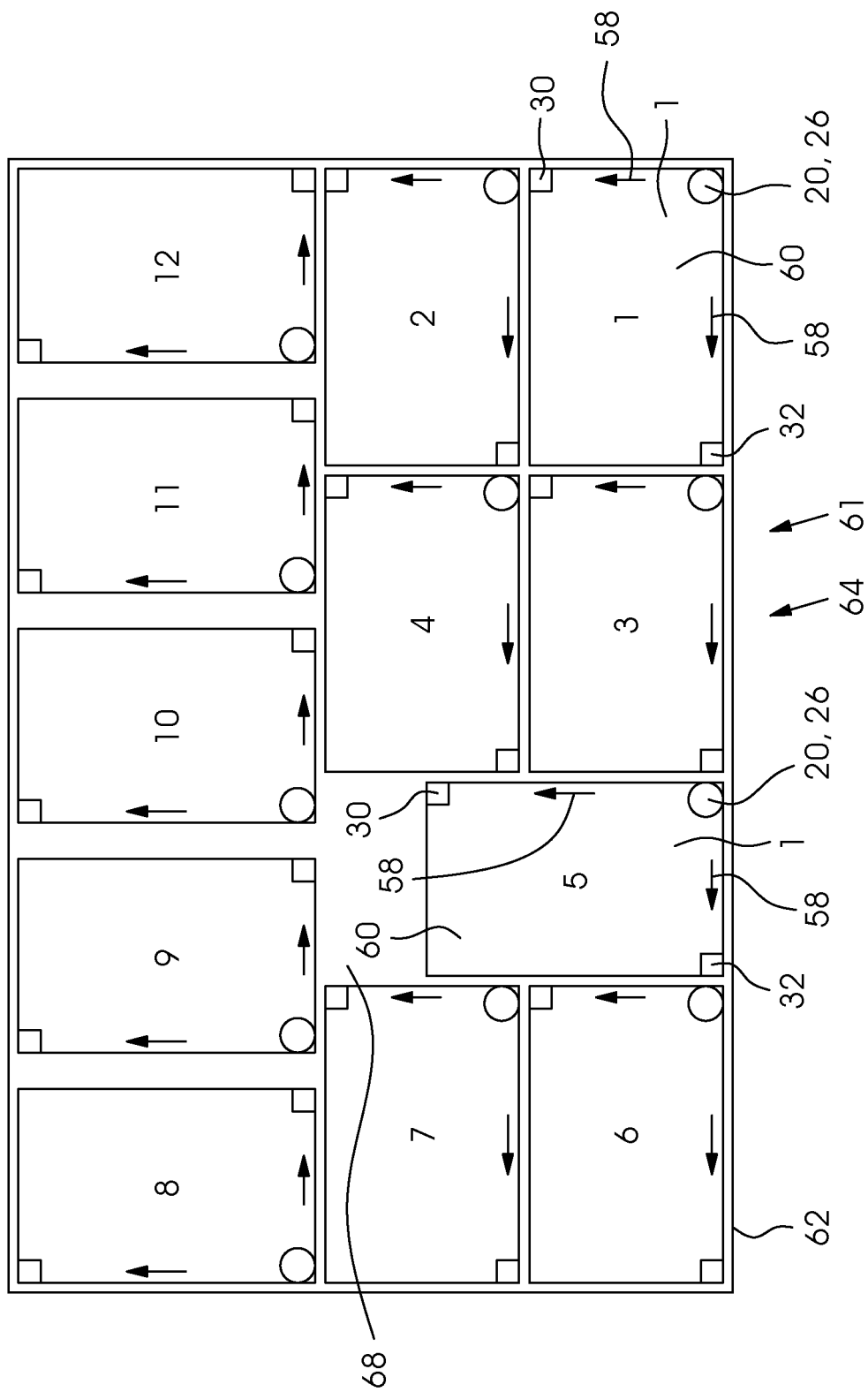

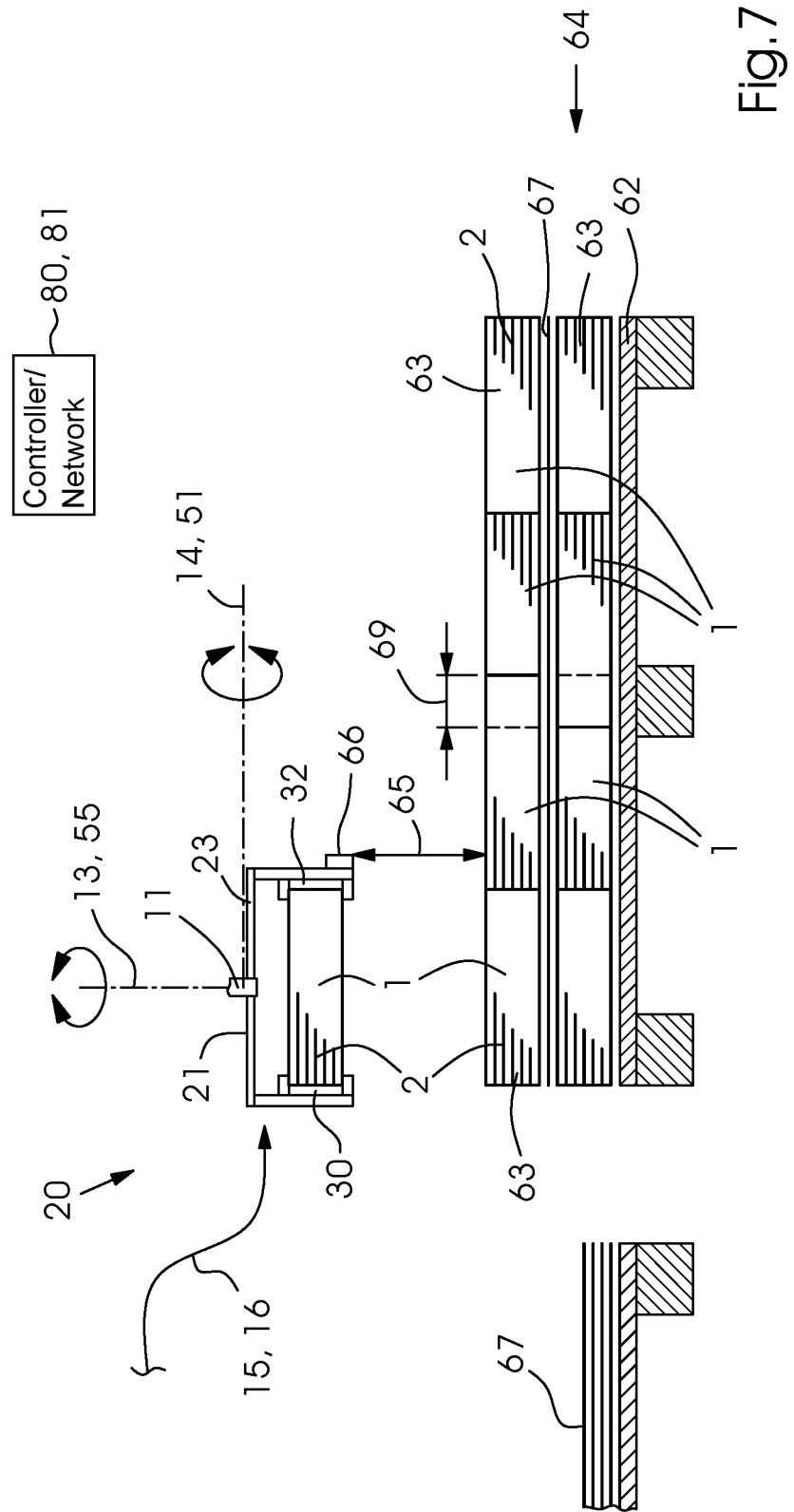

METHOD OF MOVING A STACK OF PRODUCTS USING A ROBOT

CROSS-REFERENCE TO RELATED APPLICATION

This application claims the priority, under 35 U.S.C. § 119, of German patent application DE 10 2020 103 402.4, filed Feb. 11, 2020; the prior application is herewith incorporated by reference in its entirety.

BACKGROUND OF THE INVENTION

Field of the Invention

The present invention relates to a method of moving a stack of products using a robot. The robot has an articulated arm and at least one gripper disposed on the articulated arm to grip the stack of products. The stack of products (1) is thereby selectively turned.

The technical field of the invention is the graphic industry and in particular the field of handling (e.g. gripping, holding, moving, rotating, turning and/or depositing) stacks of products, preferably stacks of printed and folded flat products, preferably made of paper, board, metal, or a composite material, by means of a manipulator, in particular a robot or an articulated robot.

It is known manually to transport stacks of products such as folded signatures from the delivery of a machine for further processing such as a folder to a pallet and to deposit them there in accordance with a known deposition scheme. This job puts a lot of strain on the body because four to five stacks of products need to be moved per minute. It is also known to use an articulated robot for this purpose, for instance a product called "CoBo-Stack" manufactured by MBO Maschinenbau Oppenweiler Binder GmbH & Co. KG based in Oppenweiler, Germany.

Japanese published patent application JPS6048848A in FIG. 11a, discloses gripping a stack of products at diagonally opposite corners and in FIG. 9, the document discloses a sagging of the stack. The two illustrated grippers belong to two separate robots.

United States publication US 2006/263196 A1 discloses to rotate and turn a stack by means of a robot gripper.

European patent EP 1645434 B1 and its counterpart U.S. Pat. No. 7,607,882 disclose to pivot a stack of products into an upright position and to transfer the stack of products to a clamp/to grip the stack of products from above.

European published patent application EP 2128056 A1 discloses a robot with an articulated arm for handling a stack and, in FIG. 4, a gripping device.

German utility model DE 202019106975 U1 and its counterpart U.S. publication No. US 2020/0354167 A1 disclose a handling device for transferring a stack of products, the handling device comprising a gripping unit movable in three dimensions. The gripper unit comprises first and second lateral faces and a respective upper and lower holding element supported for linear movement along a respective lateral face.

BRIEF SUMMARY OF THE INVENTION

It is accordingly an object of the invention to provide a method for moving a stack of product which overcomes the above-mentioned disadvantages of the heretofore-known devices and methods of this general type and which provides for a novel method that enables stacks of products to be moved in an automated way and deposited, in particular in a turned or unturned arrangement.

With the above and other objects in view there is provided, in accordance with the invention, a method of moving a stack of products, the method comprising:
  providing a robot with an articulated arm and two grippers disposed on the articulated arm;
  the grippers being configured for gripping the stack of printed products and selectively turning the stack of products;
  using the two grippers to deposit the stack of products and removing the grippers from the stack of products horizontally in two mutually perpendicular directions.

In other words, the invention relates to a method of moving a stack of products using a robot, the robot comprising an articulated arm and at least one gripper disposed on the articulated arm to grip the stack of printed products and the stack of products being selectively turned. The invention is characterized in that two grippers are used and when the stack of products is deposited, the grippers are removed from the stack of products in the horizontal in two mutually orthogonal directions.

The invention advantageously provides a way of moving stacks of products in an automated way and in particular of depositing them in a turned or unturned arrangement.

In accordance with the invention, the stack of products is advantageously handled, i.e. deposited, by two grippers; the grippers are removed from the stack of products in the horizontal in two directions perpendicular to one another. In this way, the stack of products may be released for deposit and/or the grippers may be moved away from the stack of products. Moreover, in this way, the stack of products may be deposited without disturbance. Finally, in this way, the grippers may be moved away from the stack of products without disturbance and in particular without collision.

"Selectively" is understood to mean that the stack of products is either turned or not turned. The selection may preferably be made by a digital computer, in particular as a function of what is known as a deposit scheme. "Selectively" is further understood to indicate that the method may be carried out multiple successive times with respective stacks of products and that in the process, at least one stack of products is turned and at least one stack of products is not turned.

The following paragraphs describe preferred further developments of the invention (in short: further developments).

A further development may be characterized in that when the stack of products is deposited, the grippers open in the vertical. In this process, a gripper jaw of the gripper may be moved; preferably, a gripper jaw located above the stack of products may be moved upward. The other gripper jaw, preferably the one underneath the stack of products, may be unmoved.

A further development may be characterized in that multiple stacks of products are moved and in that every stack of products is moved to a deposit position that has been selected among the deposit positions of a predefined deposit scheme in such a way that in the selected deposit position, the grippers are removed from the stack of products in the horizontal and without collision with stacks of products that have already been deposited.

Special Further Developments Pertaining to the Pivoting Movement

The invention relates to a method of moving a stack of products by means of a robot, the robot comprising an articulated arm and at least one gripper disposed on the articulated arm to grip the stack of printed products and the stack of products selectively being turned. The invention is characterized in that the stack of products is pivoted through an effective angle $\alpha1 <> 180°$ and that the stack of products is subsequently pivoted through an effective angle $\alpha2=180°-\alpha1$ or pivoted back through an effective angle $\alpha2=-\alpha1$.

The stack of products is advantageously pivoted in two steps and selectively turned in this process. In a first step, it is pivoted through an effective angle $\alpha1 <> 180°$. A second pivoting step is through an effective angle $\alpha2=180°-\alpha1$. If $\alpha1$ and $\alpha2$ both equal 90°, for example, a turn through 180° is made. If $\alpha1$ and $\alpha2$ are 90° and −90°, for instance, no turn is made.

The two-step pivoting process of the invention advantageously provides a way of introducing intermediate steps such as vibrating or straightening the edges of the stack of products. In addition, the two-step pivoting process of the invention makes it possible to carry out the two steps at different positions, for instance in that the robot carries out a movement in between. In addition, the two-step pivoting process of the invention advantageously allows the two steps to be carried out by different devices, for instance the robot and a pivoting device that is different from the robot.

The "effective angle" is understood to indicate that the angle is independent of the type of the pivoting movement. An effective angle of +90° may therefore be attained by a pivoting movement through 90°, two pivoting movements through +45° each, or a pivoting movement through −270°. Instead of "effective angle," just the term "angle" may be used.

A further development of the invention may be characterized in that the pivoting through the effective angle $\alpha1$ is achieved by a pivoting device different from the robot. The pivoting device may be assigned to a delivery of a machine for further processing, in particular a folder, and may in particular be disposed thereon. It may comprise a pivotable gripper for the stack of products. The pivoting device may be controlled by a digital computer. The pivoting device preferably pivots the stack of products through $\alpha1=90°$.

A further development may be characterized in that the step of pivoting through the effective angle $\alpha1$ occurs before the step of moving, i.e. in that the step of moving starts from the pivoted position of the stack of products. The movement is preferably achieved by the robot arm.

A further development may be characterized in that the step of pivoting through the effective angle $\alpha1$ occurs about a horizontal axis. The axis may be aligned to be parallel with the direction of transport of a delivery of a machine for further processing, in particular a folder. Before it is pivoted, the stack of products is preferably gripped and held.

A further development may be characterized in that when the stack of products is pivoted through the effective angle $\alpha1$, it is pivoted out of a horizontal position. In the horizontal position, the individual products, for instance folded signatures, in the stack of products are preferably horizontal.

A further development may be characterized in that when the stack of products is pivoted through the effective angle $\alpha1$, it is pivoted into a vertical position. In the vertical position, the individual products in the stack of products are preferably upright.

A further development may be characterized in that the stack of products is aligned and/or straightened in one direction and/or straightened in two directions perpendicular to one another and/or vibrated and/or aerated when it is not in a horizontal position and/or in that a fanned-out stack of products is transformed into an unfanned stack ("unfanning"). During this process, the stack of products may be in the pivoting device, e.g. in the gripper thereof. The gripper may be slightly open in particular for aeration. A straightening and/or unfanning device may comprise two vertical surfaces, for instance plates, preferably with lateral chamfers, that are movable relative to one another. This device may be open before the pivoting step and closed after the pivoting step. For this purpose, the surfaces may be moved towards and away from one another. Pneumatic cylinders may be provided to create the vibration. Finally the device/the surfaces thereof preferably move into an open position for the stack of products to be taken over.

A further development may be characterized in that in the vertical position, the stack of products is turned about a vertical axis, preferably through 180°. This advantageously allows the stack of products in the vertical position to be gripped from the same side both when it is selectively turned and when it is selectively not turned. The rotating may be done by the pivoting device. For this purpose, the pivoting device may have a rotary drive. The rotary drive may be controlled by a digital computer.

A further development may be characterized in that when the stack of products is turned, it is taken over from one side of the stack of products and when the stack of products is not turned, it is taken over from the same side of the stack of products. The takeover from the one side or from the other side may be carried out by an articulated arm of the robot. The selection of the side may be computer-controlled. In this process, a predefined deposit scheme may be taken into consideration.

A further development may be characterized in that the robot takes over the stack of products in the vertical position. The robot and in particular the gripper thereof may be moved towards the stack of products in a computer-controlled way, for instance from above and/or from one side.

A further development may be characterized in that the stack of products is moved in the vertical position, at least in a path section of the movement. The position of the stack of products may be changed along the path of the movement, for instance by pivoting it (about a horizontal axis) and/or by rotating it (about a vertical axis).

A further development may be characterized in that the robot takes over the stack of products from the pivoting device and moves it. The stack of products may be taken over and held by a gripping device of the robot. The movement may be achieved by moving an articulated arm of the robot. The robot may additionally be displaced in a horizontal direction. All actions of the robot may preferably be computer-controlled.

A further development may be characterized in that when the stack of products is turned, it is taken over from one side of the stack of products and when the stack of products is not turned, it is taken over from the opposite side of the stack of products. The takeover from the one side or from the other side may be carried out by an articulated arm of the robot. In this process, a gripping device of the robot may be rotated in such a way that a gripping action occurs from the one side or from the other side. The selection of the side may be computer-controlled. In this process, a predefined deposit scheme may be taken into consideration.

A further development may be characterized in that the pivoting through the effective angle $\alpha2$ occurs during the movement or in between two movement portions or after the movement. The pivoting movement may be computer-controlled. In this process, a predefined deposit scheme may be taken into consideration.

A further development may be characterized in that the pivoting through the effective angle α2 is done using the robot. The pivoting movement may be achieved by a corresponding movement of an articulated arm of the robot and/or by a pivoting device on the robot/on the articulated arm thereof and/or by a pivotable gripping device on the robot/the articulated arm thereof. The pivoting movement may be computer-controlled.

A further development may be characterized in that as the stack of products is pivoted through the effective angle α2, it is pivoted back into a horizontal position. In this case, the stack of products is not turned, i.e. it is deposited unturned.

A further development may be characterized in that the stack of products is deposited in the horizontal position. The stack is preferably deposited on a pallet. To deposit the stack, grippers on the robot may simultaneously or successively be opened and moved away laterally.

A further development may be characterized in that before the stack of products is deposited, it is rotated about a vertical axis. This allows the alignment of the stack of products in the horizontal to be modified, for instance effectively by 90° or 180°. The rotating movement may be computer-controlled. In this process, a predefined deposit scheme may be taken into consideration.

A further development may be characterized in that the effective angle α1 equals 90° and the effective angle α2 equals 90° and that the stack is pivoted further through α2. When the stack is pivoted further, the pivoting movement through α1 and the pivoting movement through α2 preferably occur in the same pivoting direction. In this process, the total effect is that the stack of products is turned.

A further development may be characterized in that the effective angle α1 equals 90° and the effective angle α2 equals −90° and that the stack is pivoted back through α2. When the stack is pivoted back, the pivoting movement through α1 and the pivoting movement through α2 preferably occur in opposite pivoting directions. In this process, the total effect is that the stack of products is not turned.

A further development may be characterized in that the stack of products is held by at least two grippers during the movement.

A further development may be characterized in that the stack of products is held in a form-fitting/positive and/or force-fitting/non-positive way during the movement.

A further development may be characterized in that one side of the stack of products has at least four corners and in that the stack of products is held at diagonally opposite corners during the movement. If there are more than four corners, edges may be selected that are spaced apart by a large distance and/or are spaced apart in a way that is a good approximation to being diagonally opposite each other.

A further development may be characterized in that selectively, two diagonally opposite corners or two other diagonally opposite corners may be held. The selection of the corners may be computer-controlled. In this process, a predefined deposit scheme may be taken into consideration. For this purpose, a gripping device on the robot arm is preferably rotated.

A further development may be characterized in that the stack of products is held in such a way that the stack of products sags. For this purpose, the distance between grippers of the robot may be reduced preferably in a computer-controlled way until a desired or predefined sag is attained. The stack of products may be formed of folded paper sheets.

A further development may be characterized in that the stack of products is held in such a way that the stack of products sags diagonally. In this way, the stack of products with the diagonal as its "lowest point" may be deposited in a controlled and self-fixing way. For this purpose, the stack of products may be held on diagonally opposite corners.

Special Further Developments Pertaining to Stack Deposition

The following paragraphs describe further preferred further developments of the invention (in short: further developments).

A further development may be characterized in that the movement is terminated at a selected deposit position among multiple deposit positions of a predefined deposit scheme. The deposit scheme may be saved on a digital computer or on a network connected thereto. A plurality of deposit schemes may be saved, for instance in a database. The selection of the deposit position (and/or a succession of deposit positions for stacks of products to be moved in succession) may be computer-controlled. When a transport stack is built up out of stacks of products, a deposit scheme may be selected for every horizontal layer, in particular different deposit schemes may be selected for two successive layers.

A further development may be characterized in that the stack of products is deposited at the selected deposit position on a base, preferably a pallet.

A further development may be characterized in that the stack of products is held in such a way that the stack of products sags diagonally and that when the diagonally-sagging stack is deposited, the sagging portion is the first to touch the base.

A further development may be characterized in that the deposit scheme is saved on a digital computer or downloaded to the digital computer from another computer via a network and in that the movement is controlled by the digital computer.

A further development may be characterized in that the deposit scheme is calculated and/or selected by the digital computer as a function of at least one of the following parameters: dimensions of the stack of products; dimensions of the base; in a case in which the stack of products is a stack of folded products: position of the folding edges relative to the base and/or structure of the folding edges as a function of the type of fold.

A further development may be characterized in that multiple stacks of products are successively moved, selectively turned, selectively rotated in the horizontal, and deposited at respective selected deposit positions among multiple deposit positions of the predefined deposit scheme. In this process, a computer-controlled robot with an articulated arm and a gripping device may be used.

Further Developments

The following paragraphs describe further preferred further developments of the invention (in short: further developments).

A further development may be characterized in that the movement of the stack of products occurs from a delivery of a machine for the further processing of printed products, for instance a folder, a saddle stitcher, or a perfect binder, to a pallet or to one of several pallets. In the latter case, non-stop operation is possible.

A further development may be characterized in that the movement of the stack of products occurs from a delivery of a machine for the further processing of printed products, for instance a folder, a saddle stitcher, or a perfect binder, to a pallet or to one of several pallets.

A further development may be characterized in that the stacks of products in the delivery are transported in a direction of transport and are separated from one another in the direction of transport. The transport may occur on a roller-type conveyor. For the separation, individual drivable rollers may be driven or stopped in an appropriate way.

A further development may be characterized in that the robot is movable and usable in multiple positions of a machine for further processing or on multiple machines for further processing. For this purpose, the robot may be supported on rollers and/or rails.

A further development may be characterized in that the stack of products is formed of folded and/or die-cut printed products.

A further development may be characterized in that multiple stacks of products are stacked on top of one another to be horizontally offset relative to one another and in multiple horizontal planes above one another to form a transport stack on a transport pallet or in that a transport stack is formed or built up in a corresponding way. The selection of the offset and/or of the planes may be computer-controlled. In this process, a predefined deposit scheme may be taken into consideration.

A further development may be characterized in that a sensor disposed on the robot detects the height of the transport stack. The sensor may be disposed on a gripping device of the robot. Multiple sensors may be provided. The height may be determined in absolute terms, for instance measured from the upper edge of a pallet or floor, or in relative terms as a distance to the sensor.

A further development may be characterized in that the height is detected as a single height value, a number of height values at various horizontal positions, or a height profile.

A further development may be characterized in that the sensor is embodied as a distance sensor for measuring the height or as a camera with digital image processing to calculate the height on the basis of the camera image.

A further development may be characterized in that the robot arm is moved without collision over a transport stack that has only partly been built up and in that the digital computer factors in the detected height as it controls the movement of the robot arm.

A further development may be characterized in that the robot takes individual intermediate layers off of a stack and deposits them on respective planes. The intermediate layers may be made of cardboard. The deposit of intermediate layers may be computer-controlled. In this process, a predefined deposit scheme and/or stacking scheme may be taken into consideration.

A further development may be characterized in that the intermediate layer is held by suction. For this purpose, a suction gripper may be disposed on a gripping device of the robot. A number of such suction grippers may be used.

A further development may be characterized in that the movement is done in a fully automated way, as a function of a selected deposit scheme and/or stacking scheme and in a way adapted to the production speed at least of the machine for further processing.

A further development may be characterized in that the movement of the robot arm occurs in a protected area.

A further development may be characterized in that to create the protected area, a housing and/or a fence and/or a light barrier and/or a monitoring camera is used.

Special Further Developments Pertaining to a Device for Implementing the Method

The following paragraphs describe further preferred further developments of the invention (in short: further developments).

A further development of the method of the invention may be characterized by the use of a device with a robot to move a stack of products, the robot comprising an articulated arm and a first gripper for the stack of products, the first gripper disposed on the articulated arm. The method is characterized in that a gripping device comprising the first gripper and a second gripper is disposed on the articulated arm, the first gripper and the second gripper being positioned relative to one another.

The afore-mentioned device as such may represent a further invention:

a device for moving a stack of products using a robot, the robot comprising an articulated arm and a first gripper for the stack of products, the gripper disposed on the articulated arm. The method is characterized in that a gripping device comprising the first gripper and a second gripper is disposed on the articulated arm, the first gripper and the second gripper being positionable relative to one another.

The device as such or the use thereof advantageously provides a way of moving stacks of products in an automated way, in particular to deposit them in a turned or unturned arrangement.

A particular advantage may be considered to be that stacks of products of different sizes or formats may be moved and in particular selectively deposited in a turned or unturned arrangement.

The following paragraphs describe preferred further developments of the invention (in short: further developments). These further developments may also represent preferred further developments of the further invention, i.e. the device as such.

A further development may be characterized in that the two grippers are positionable, preferably in a computer-controlled way, to accommodate predefined formats of products or stacks of products. The grippers may be movable, preferably linearly movable, for positioning purposes. The positioning is preferably computer-controlled.

A further development may be characterized in that the two grippers are positionable on the two ends of a selected diagonal of a selected format. The positioning is preferably computer-controlled.

A further development may be characterized in that the first gripper is designed as a first pliers-type gripper with a first pair of gripper jaws and the second gripper is designed as a second pliers-type gripper with a second pair of gripper jaws.

A further development may be characterized in that each one of the two pairs of gripper jaws comprises an immovable gripper jaw and a mobile gripper jaw that is linearly movable relative to the immovable gripper jaw. Linear drives may be provided, preferably electric linear drives with threaded spindles. Of course, the immovable gripper jaws are not totally immovable they may be moved by the motion of the robot, of the gripping device and/or of the grippers. The immovable gripper jaws are only unmoved or only negligibly moved relative to the movable gripper jaws when the grippers open and close.

A further development may be characterized in that each one of the immovable gripper jaws comprises a support element extending in a horizontal direction and at least one stop element extending in a vertical direction.

A further development may be characterized in that each one of the immovable gripper jaws comprises a support surface extending in a horizontal direction as the support element and two stop surfaces extending in a vertical direction and perpendicular to one another as stop elements. All surfaces may be perpendicular to one another.

A further development may be characterized in that the stack of products is held in a form-fitting/positive and/or friction-fitting/non-positive way during the movement.

A further development may be characterized in that at least one blower device is disposed on the gripping device to blow air under the stack of products when the stack of products is deposited.

A further development may be characterized in that at least one further gripper is disposed on the gripping device, the further gripper designed as a suction gripper for intermediate layers. For suction-based gripping and holding, suction air may be applied to the suction gripper in a computer-controlled way.

A further development may be characterized in that at least one distance sensor and/or at least one camera is provided on the gripping device.

A further development may be characterized in that the gripping device comprises a first support arm and the first gripper is disposed on the first support arm for linear movement in the longitudinal direction thereof.

A further development may be characterized in that the gripping device comprises a second support arm and the second gripper is disposed on the second support arm for linear movement in the longitudinal direction thereof.

A linear drive, preferably an electric linear drive with a threaded spindle, may be provided on the support arm to move the grippers along the support arms. The linear drive may be electric. The support arm may have a length correlating with a maximum-format stack of products to be moved.

A further development may be characterized in that the first support arm and the second support arm are disposed on the gripping device so as to be perpendicular to one another. The support arms may form an X-Y axis system for format-adjustable grippers. Movable gripper jaws of the grippers may form the Z axis that is perpendicular thereto.

A further development may be characterized in that the two linearly movable gripper jaws are movable in a direction perpendicular to the respective support arm.

A further development may be characterized in that the gripping device is disposed on the robot arm so as to be rotatable about an axis of rotation. The axis of rotation is preferably for rotating the stack of products about a vertical axis and/or for depositing a stack of products that has been rotated in the horizontal.

A further development may be characterized in that the gripping device is disposed on the robot arm so as to be pivotable about a pivot axis perpendicular to the axis of rotation. The pivot axis is preferably for pivoting the stack of products about a horizontal axis and/or for depositing a stack of products that has selectively been turned or not turned relative to the horizontal.

A further development may be characterized in that the articulated arm has six axes, preferably axes of rotation.

A further development may be characterized in that the robot is horizontally displaceable, for instance on rails or rollers, relative to one or more machines for further processing that create stacks of products.

In any desired combination with one another, the features and combinations of features described in the above sections Technical Field, Invention, and in the various sections above on further developments as well as in the following section Exemplary Embodiments represent further advantageous further developments of the invention.

Alternatives

As an alternative to the aforementioned two-step pivoting process, the object may be attained by a single-step pivoting process. In this process, for selective turning, the stack of products in horizontal alignment is preferably gripped from below by the gripping device of an articulated robot and pivoted through an effective angle of 180°, for instance while it is being moved to the pallet. If the stack is not to be turned, the stack of products in horizontal alignment may preferably be gripped from above.

Other features which are considered as characteristic for the invention are set forth in the appended claims.

Although the invention is illustrated and described herein as embodied in a method of moving a stack of products using a robot, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIGS. 6A and 6B are schematic views illustrating preferred exemplary embodiments of deposit schemes;

FIG. 7 is a side view illustrating an exemplary embodiment of a transport stack.

DETAILED DESCRIPTION OF THE INVENTION

Figure 1:
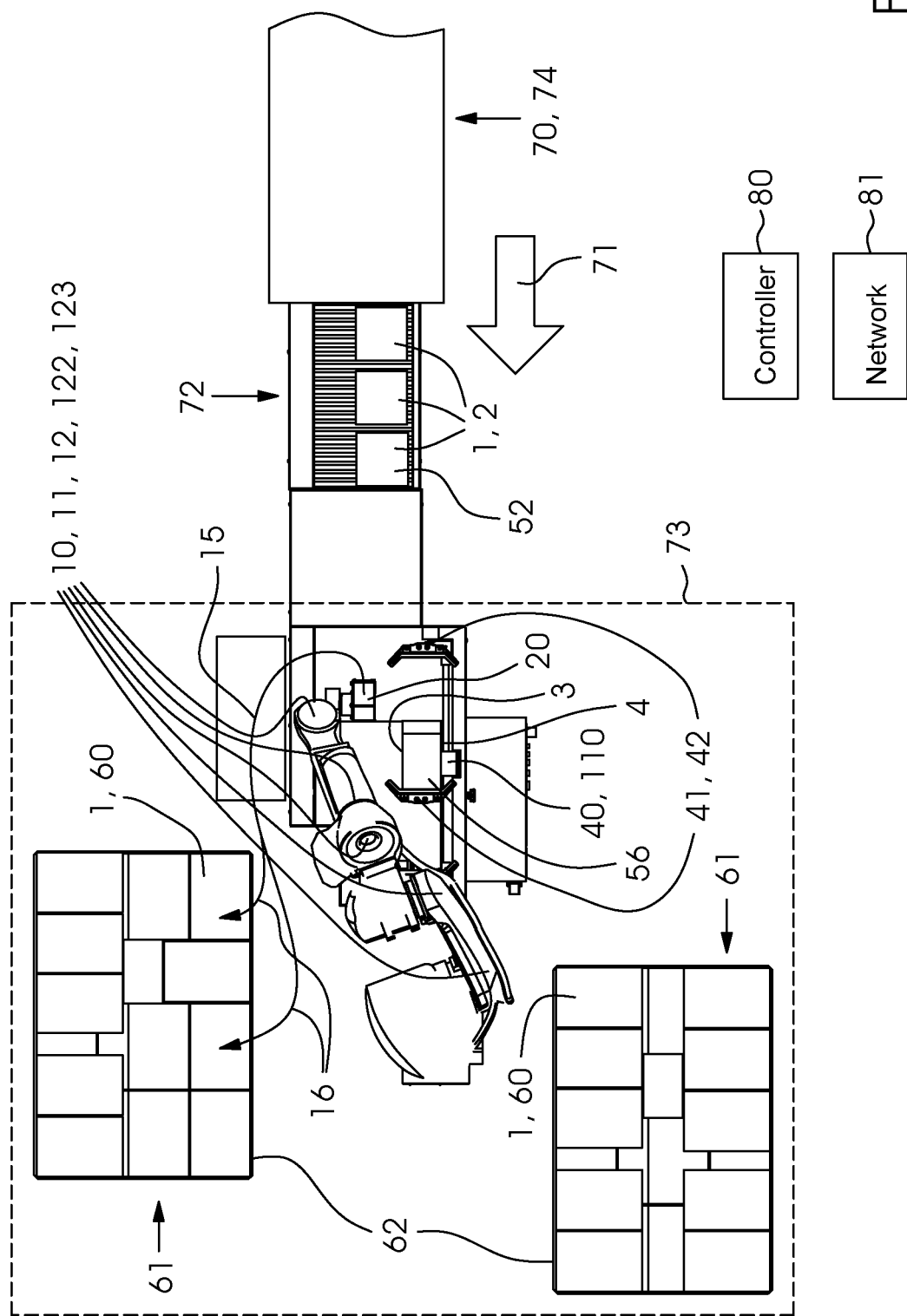
FIG. 1 is a top plan view onto an exemplary embodiment of a device for carrying out the method according to the invention.

Referring now to the figures of the drawing in detail and first, in particular, to FIG. 1 thereof, there is shown a preferred exemplary embodiment of a device comprising a robot and carrying out steps of a preferred embodiment of the method of the invention.

A machine 70 for further processing, preferably a folder, which is only partly shown, is located in a position 74 and produces printed products 2, preferably printed and/or folded signatures 2, which are in the form of stacks 1 of products and are moved, e.g. conveyed, in a direction of transport 71 on a delivery 72. The action of the delivery, in particular the conveying action, may be controlled by the digital computer 80. A stack of products preferably comprises a plurality of products resting on top of one another.

A digital computer 80, which is preferably connected to a network 81, may control the machine 70 for further processing and optionally further machinery; for instance, it may provide job data for the manufacturing of products. Job data may be provided via the network.

The delivery 72 may move the stacks 1 of products into a protected zone 73. A robot 10, preferably a robot comprising an articulated arm 11 with multiple axes 12, for instance six axes, may be disposed in this zone. The robot may be a common industrial robot.

A gripping device 20 is disposed on the robot 10, preferably at the end of the articulated arm/"hand" 11 thereof. The gripping device may grip and hold stacks 1 of products to move them away from the delivery 72, preferably only within the protected zone. The movement 15 moves the stack 1 of products along a spatial curve to a transport pallet 62, where the stack of products is deposited and preferably positioned at a deposit location 60 in accordance with a deposit scheme 61. A number of pallets may preferably be provided within reach of the robot. The movement may comprise multiple movement portions 16. In between two movement portions, the gripping device may be rotated and/or pivoted, for instance. The rotating and/or pivoting may likewise occur during the movement.

A pivoting device 40 is preferably disposed at the end of the delivery 72. The pivoting device 40 may pivot the stacks 1 of products out of the horizontal 50/a horizontal plane 53/the horizontal position 52 into the vertical 54/the vertical plane 57/the vertical position 56. The pivoting device may comprise two alignment elements 41, which are preferably movable in a horizontal direction, and/or straightening elements 42 for the stack of products. They may be embodied as surfaces, for instance plates.

The action, in particular the movement 15 and/or 16 of the robot 10, and/or the action, in particular the pivoting, of the pivoting device, may be controlled by the digital computer 80.

Figure 2:
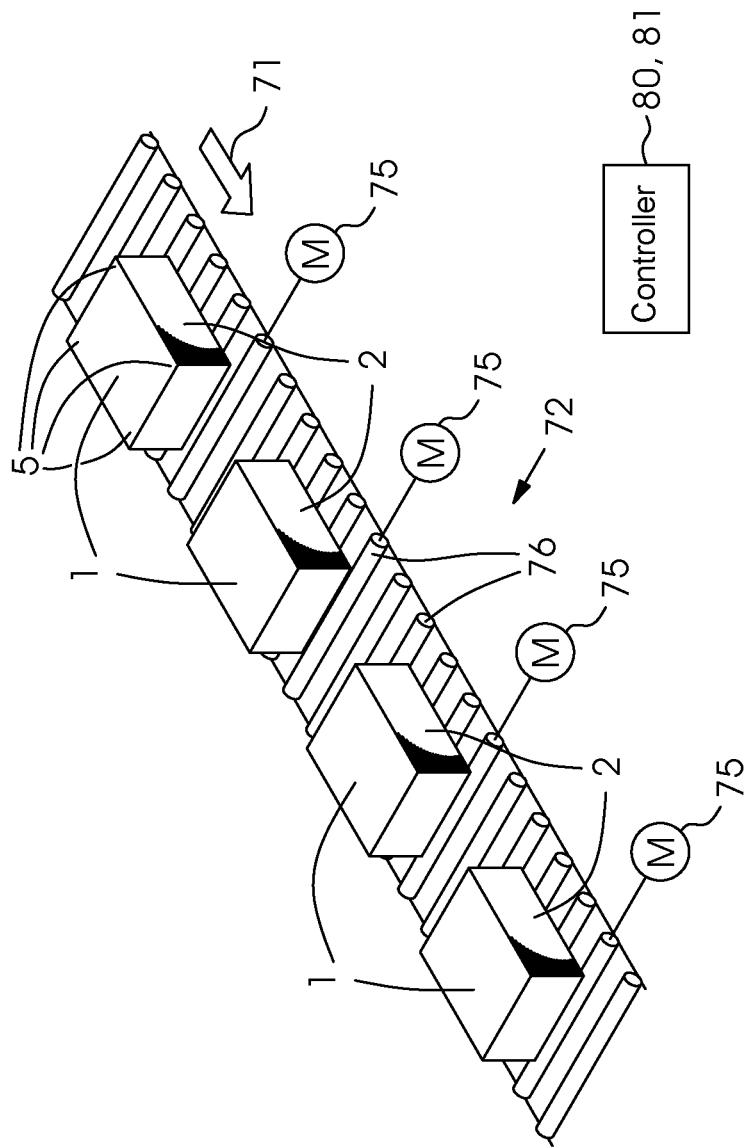
FIG. 2 is a perspective view of a delivery.

FIG. 2 illustrates a preferred exemplary embodiment of a delivery of a machine for further processing. The delivery 72 may comprise a plurality of rollers 76. The delivery may be a roller conveyor. Some of the rollers may be driven, for instance by motors 75. The digital computer 80 may control the process of conveying the stacks 1 of products 2 resting on top of one another. In this process, the stacks of products may be separated from one another in the direction of transport 71. The products 2 and therefore also the stacks 1 of products that have been formed preferably have four corners 5. Die-cut products may have more corners. If the products are folded products, their folding edges are preferably oriented to be parallel to the direction of transport.

Figure 3A:
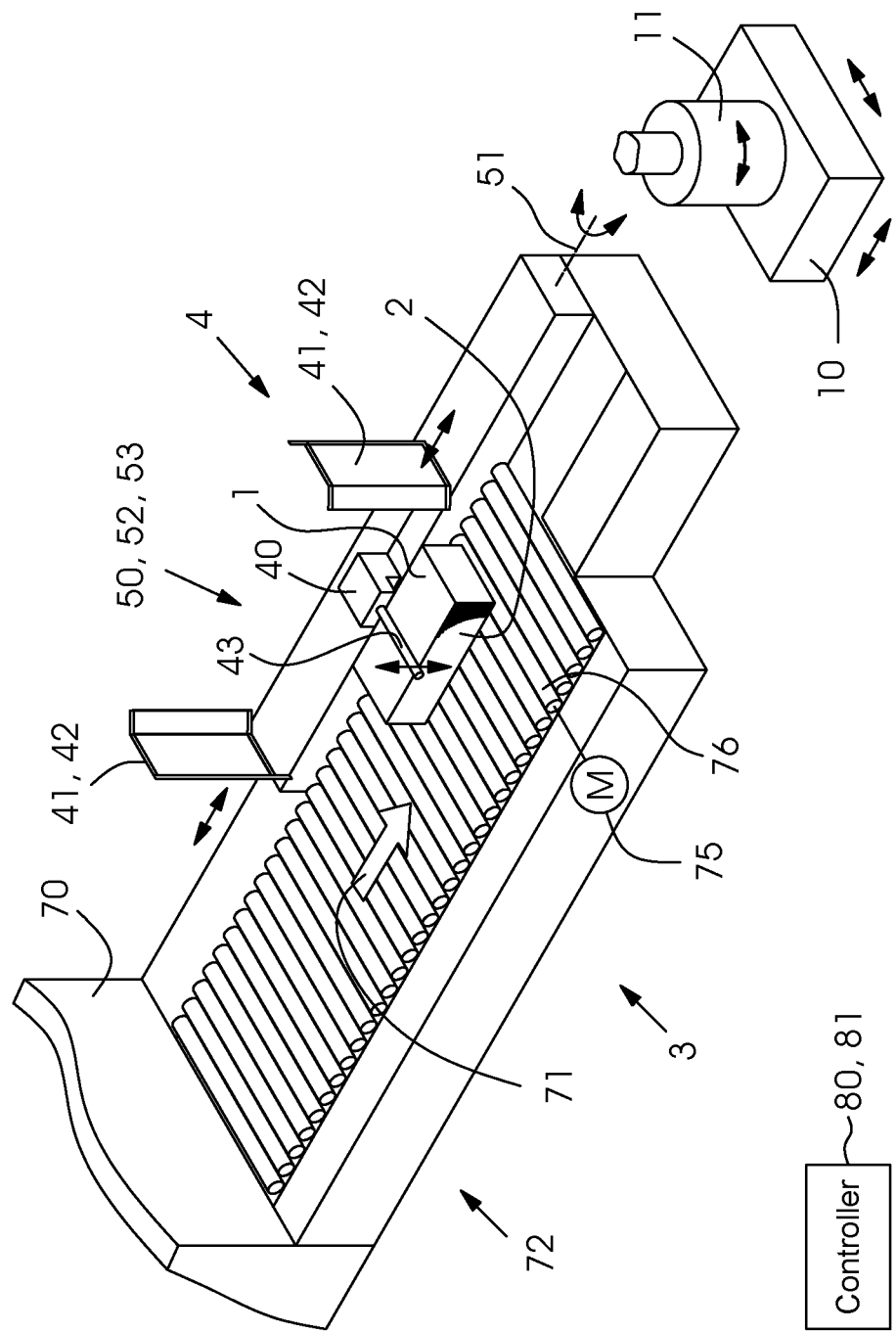
FIGS. 3A and 3B are perspective views the delivery during processing according to the novel method.
Figure 3B:
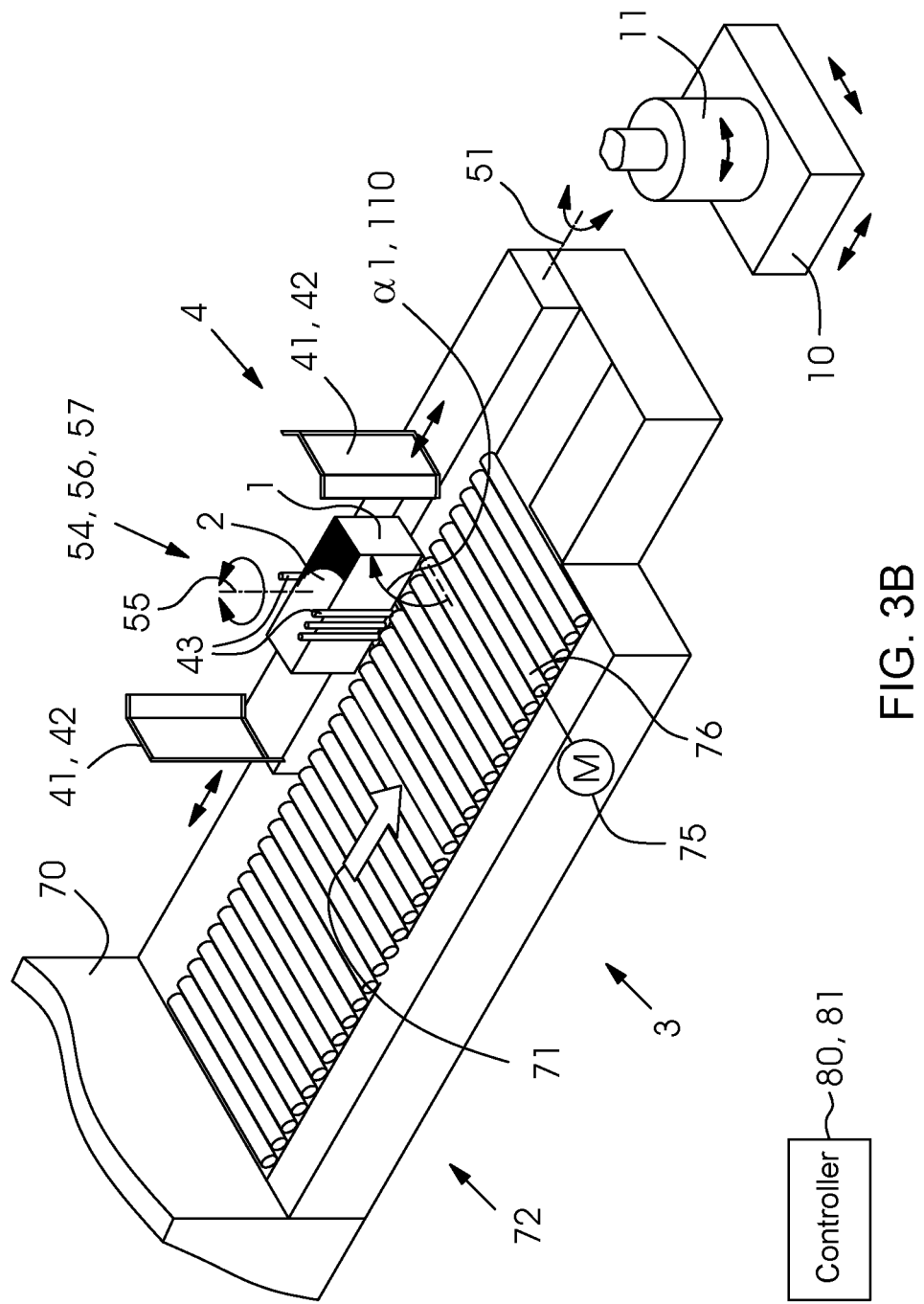

FIGS. 3A and 3B illustrate preferred exemplary embodiments of the delivery, preferably comprising a pivoting device, as they carry out steps of a preferred embodiment of the method of the invention. The figures are perspective views.

FIGS. 3A and 3B illustrate the end of the folder 70 and the delivery 72 on which the stacks 1 of products are conveyed in the direction 71 of transport up to a pivoting device 40 (transporting step 101). Before being pivoted, the stacks of products and consequently the products 2 are preferably in a horizontal position 52.

The pivoting device 40 preferably comprises grippers 43, for instance bars movable relative to one another, preferably one bar (closing "hold-down element") on one side of the stack 1 of products and three bars on the other side of the latter. The pivoting device and/or the grippers thereof may be pivoted about a horizontal axis 51. The grippers, which are located below the stack 1 of products in FIG. 3A, may be positioned between the rollers 76 and may be pivoted out of this position.

FIGS. 3A and 3B illustrate sections of the robot 10 and the articulated arm 11 thereof. The robot is preferably movable in a horizontal direction on the floor and therefore positionable at various locations. The robot may, for instance, be supported on rollers. For example, rails may be provided.

FIGS. 3A and 3B illustrate the—preferably horizontally movable—alignment elements 41 and/or straightening elements 42.

A comparison between FIGS. 3A and 3B illustrates the pivoting movement 110 through an effective angle $\alpha 1$ (pivoting step 110). In the illustrated example, the angle $\alpha 1$ is preferably 90°. After the pivoting step, the stack 1 of products is preferably in a vertical position 56. If the products 2 are folded products, in the vertical position, the spines are preferably at the top.

FIGS. 3A and 3B illustrate two sides 3 and 4. The robot 1 may preferably grip the pivoted stack 1 of products from side 3 or from the opposite side 4. Side 3 may be referred to as the front side and side 4 as the back side. The selection of the side may be computer-controlled as a function of a deposit scheme.

The pivoting device may optionally be designed for rotation and may thus be rotated about a vertical axis 55. The stack of products may preferably be rotated through 180°. In accordance with this option, the robot 1 may always grip the pivoted stack 1 of products from the same side, preferably from side 3/the front side.

FIGS. 4A to 4D illustrate preferred exemplary embodiments of a robot-guided gripping device as it carries out steps of a preferred embodiment of the method of the invention. The figures are perspective views.

FIGS. 4A to 4D illustrate a flange 26 of the robot 10. The gripping device 20 for stacks 1 of products is preferably disposed on the flange. The gripping device is preferably disposed for rotation about an axis of rotation 13 (rotating step 142). The gripping device is disposed to pivot about a pivoting axis 14 (further pivoting step 122 or back pivoting step 123). Both the axis of rotation and the pivoting axis may be a respective single axis 12 of the robot or respective multiple axes.

The gripping device 20 preferably comprises two support arms: a first support arm 21 and a second support arm 23. The support arms are preferably perpendicular to one another. A first gripper 30 is preferably disposed on the first support arm so as to be movable in a first longitudinal direction 22. A second gripper 32 is preferably disposed on the second arm so as to be movable in a second longitudinal direction 24. The grippers may be driven by linear drives 25 to be adjusted as a function of the format.

The first gripper 30 preferably comprises a first pair of gripper jaws 31 including an immovable gripper jaw 31*a* and a movable gripper jaw 31*b*. The movable gripper jaw may be driven by a linear drive 37. The second gripper 32 preferably comprises a second pair of gripper jaws 33 including an immovable gripper jaw 33*a* and a movable gripper jaw 33*b*. The movable gripper jaw may be driven by a linear drive 37. Each one of the immovable gripper jaws may comprise a support element 34, preferably a support surface. The movable gripper jaws act to open and close the grippers.

Figure 5:
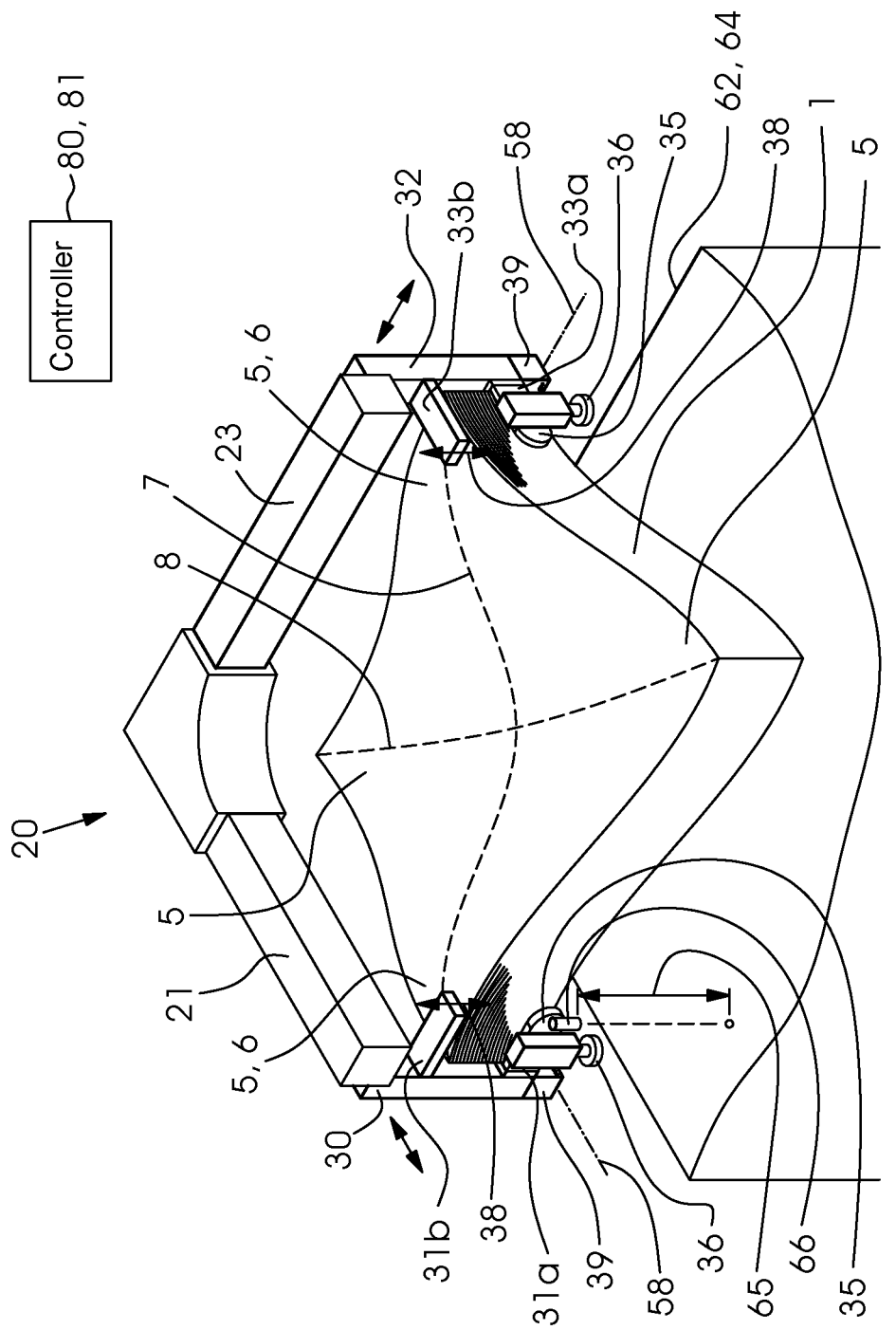
FIG. 5 is a perspective view of an exemplary embodiment of a gripping device.

The grippers 30 and a 32 grip the stack 1 of products 2 preferably at the corners 5 thereof and especially at corners 6 that are diagonally opposite one another (see diagonal 7 in FIG. 5).

Figure 4A:
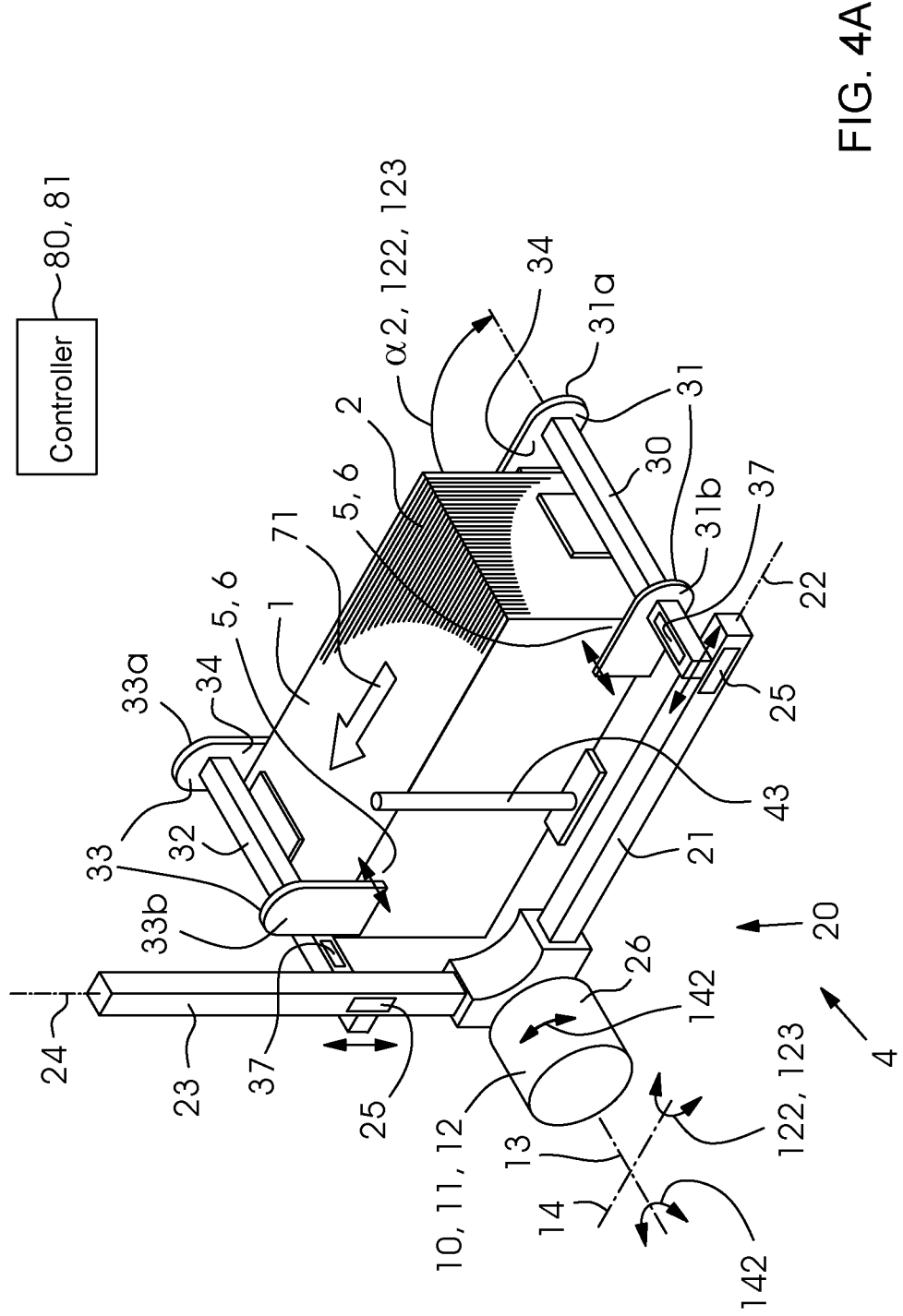
FIGS. 4A to 4D are perspective views of exemplary embodiments of a robot-guided gripping device as it carries out steps of a preferred embodiment of the method according to the invention.

In the example shown in FIG. 4A, the gripping device 20 grips the stack 1 of products that has been pivoted into a vertical position from side 4, i.e. from the back side, for instance. In other words, when the gripping device grips the stack of products, it is preferably located on side 4. To illustrate this, the transport direction 71 is indicated.

Figure 4B:
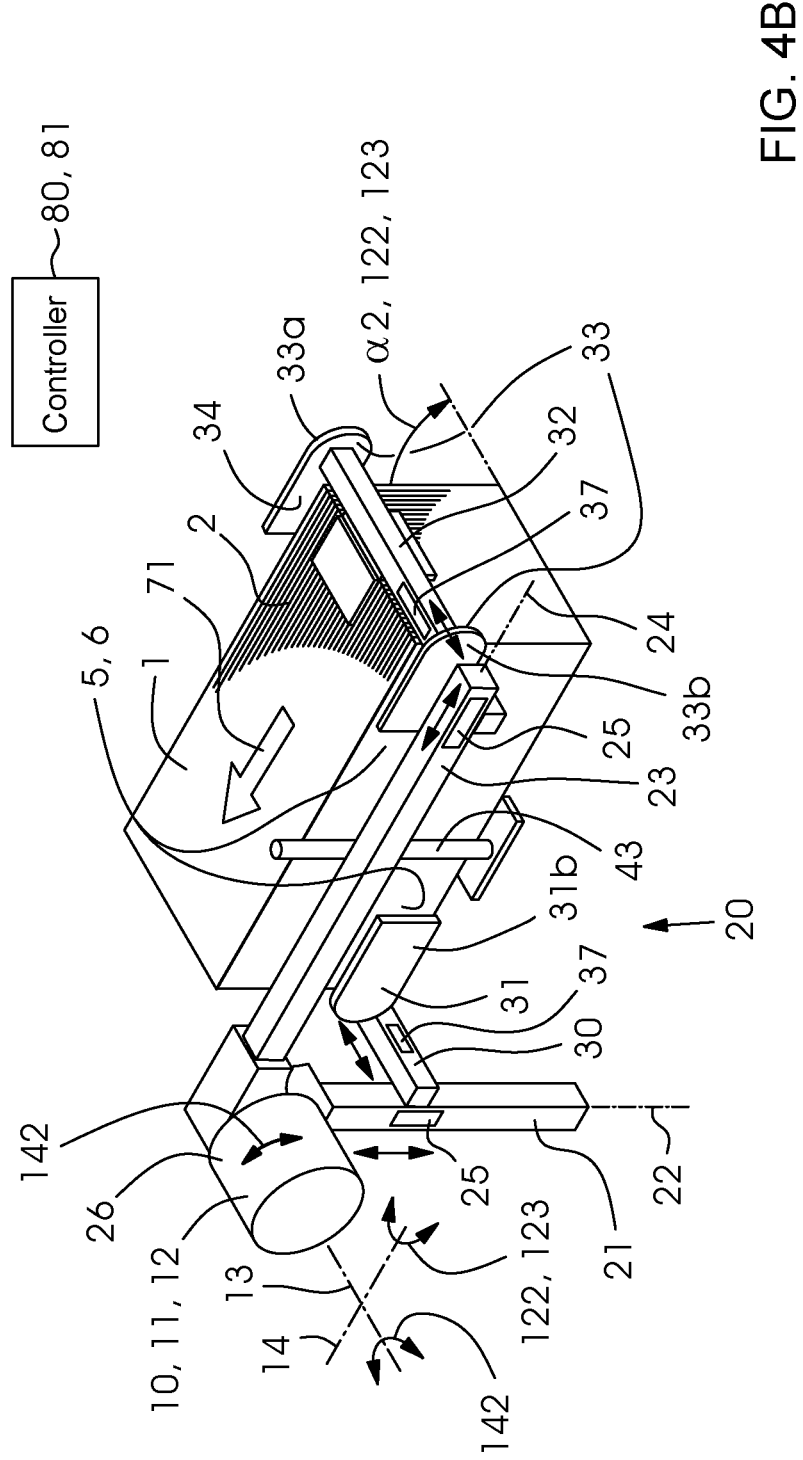

In the example shown in FIG. 4B, the gripping device 20 likewise grips the stack 1 of products that has been pivoted into a vertical position from side 4, i.e. from the back side, for instance.

A comparison between FIGS. 4A and 4B shows that either the one pair of corners 5 (top left and bottom right) or the other pair of corners 5 (bottom left and top right) may be gripped. The edges may be selected in a computer-controlled way and as a function of a deposit scheme.

Figure 4C:
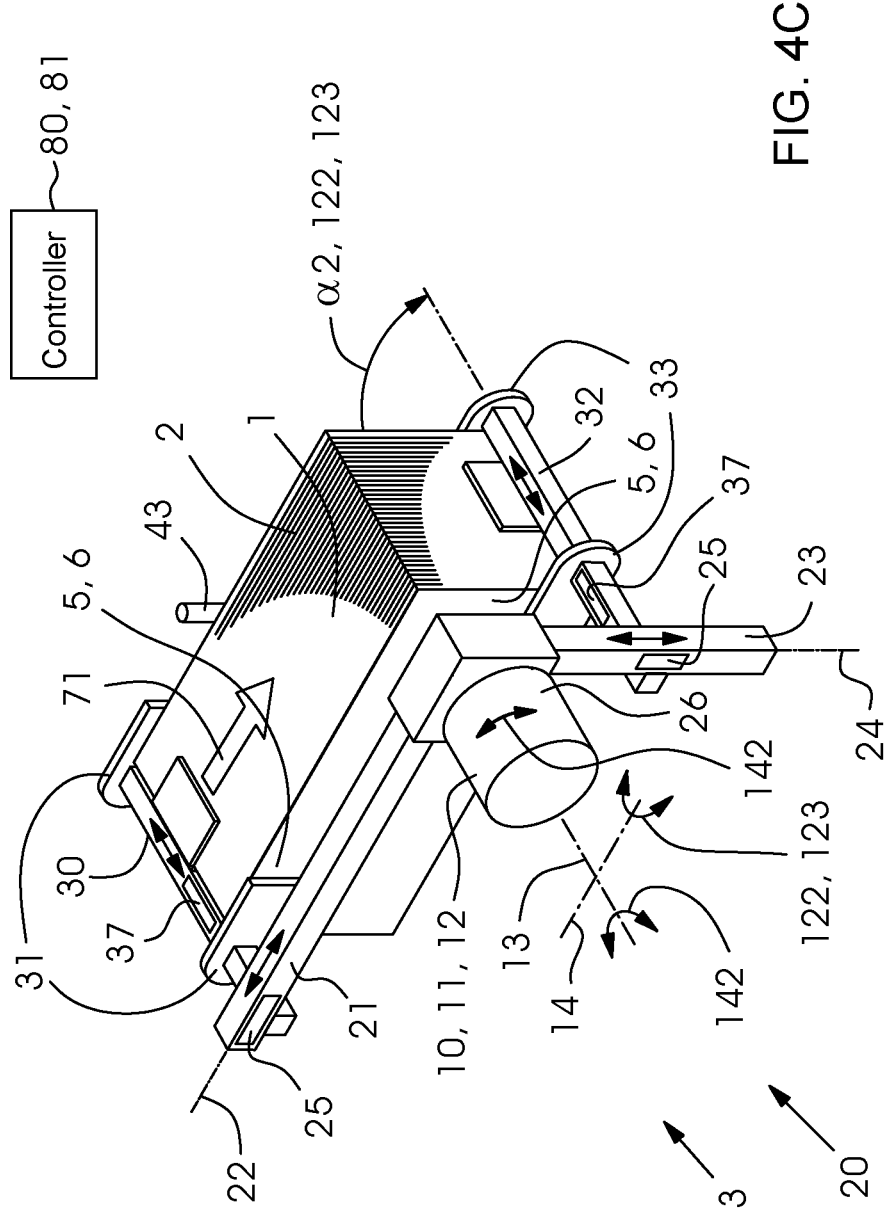

In the example shown in FIG. 4C, the gripping device 20 grips the stack 1 of products that has been pivoted into a vertical position from side 3, i.e. from the front side, for instance.

Figure 4D:
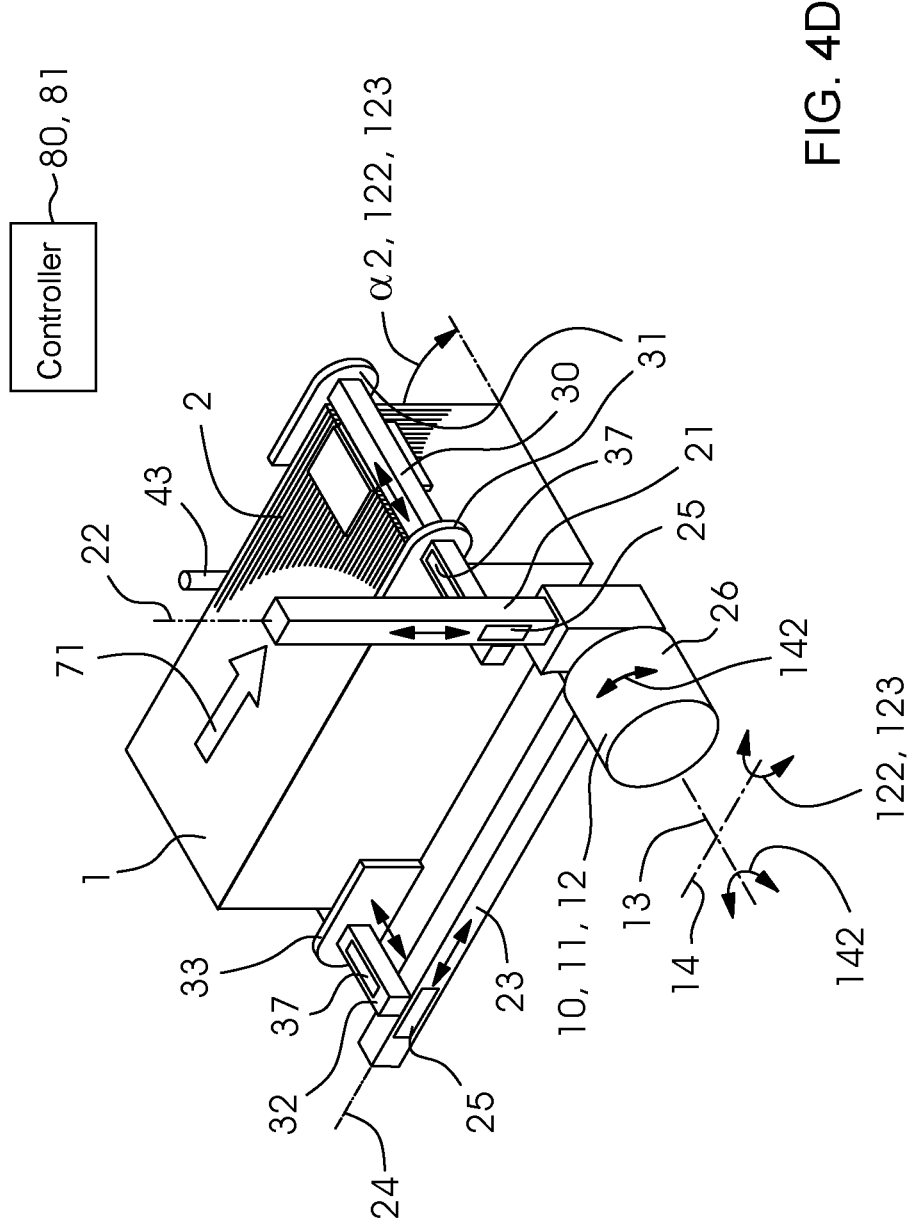

In the example shown in FIG. 4D, the gripping device 20 grips the stack 1 of products that has been pivoted into a vertical position from side 3, i.e. from the front side, for instance.

A comparison between FIGS. 4C and 4D in turn shows that either the one pair of corners 5 (top left and bottom right) or the other pair of corners 5 (bottom left and top right) may be gripped. The edges may again be selected in a computer-controlled way and as a function of a deposit scheme.

The decision whether the stack 1 of products is gripped from side 3 or from side 4 and whether the one pair of corners 5 or the other pair of corners 5 is gripped in this process depends on how the stack of products is to be deposited—whether it is to be deposited in a turned or unturned arrangement and whether it is to be deposited in a rotated or unrotated arrangement. This in turn depends on a selected deposit scheme and the respective deposit position within this scheme. The digital computer 80 controls the gripping operation and the appropriate action of the robot 10 in accordance with the deposit scheme and deposit position. In this process, the side and the corners are selected accordingly.

Having been gripped and during the movement 130, in particular in between two movement portions 130a and 130b and preferably before being deposited (step 152), the stack 1 of products is pivoted through effective angle α2—either pivoted further (step 122) or pivoted back (step 123). When it is pivoted further, the stack of products is preferably deposited in a turned arrangement (turning step 140); when it is pivoted back, it is deposited in an unturned arrangement (non-turning step 141).

FIG. 5 illustrates a preferred exemplary embodiment of the gripping device as it carries out step 150 of letting a stack of products sag in accordance with a preferred embodiment of the method of the invention. The figure is a perspective view.

FIG. 5 shows the gripping device 20 with the two grippers 30 and 32. The grippers hold a stack 1 of products at diagonally opposite corners 6. The grippers are positioned/spaced apart from one another on the two support arms 21 and 23 as a function of the format of the stack of products and in such a way that the stack of products sags (step 150 of letting the stack sag). When the stack of products is deposited on the transport pallet 62 or on a transport stack 64 that has already been formed, the sagging diagonal 8 is the first part to touch the pallet/the transport stack. This allows the stack of products to be deposited in a precise way without disturbance and the open grippers 30 and 32 to be moved away from the stack of products by moving them in directions 58 perpendicular to one another. The digital computer 80 may control the opening and moving away.

FIG. 5 illustrates the two immovable gripper jaws 31a and 33a with two respective stop elements 35, in particular stop surfaces 35. When the stack 1 of products is deposited, the two support elements 34 (disposed below the stack of products and therefore not visible in FIG. 5) are preferably oriented in a horizontal direction, whereas the respective two, i.e. four, stop elements are preferably oriented in a vertical direction. The opening and closing of the grippers/the movement of the movable gripper jaws 31b and 33b occurs in a direction 38.

FIG. 5 illustrates a sensor 66, preferably disposed on one of the immovable (lower) gripper jaws 31a or 33a. The sensor may measure the distance to the pallet or to the transport stack that has already been formed or the height 65 and may transmit the measured value to the digital computer 80, allowing the latter to control a precise and in particular collision-free deposit.

FIG. 5 illustrates two further grippers 36, in particular suction gripper 36. They are preferably used to grip and hold intermediate layers 67.

Figure 6B:
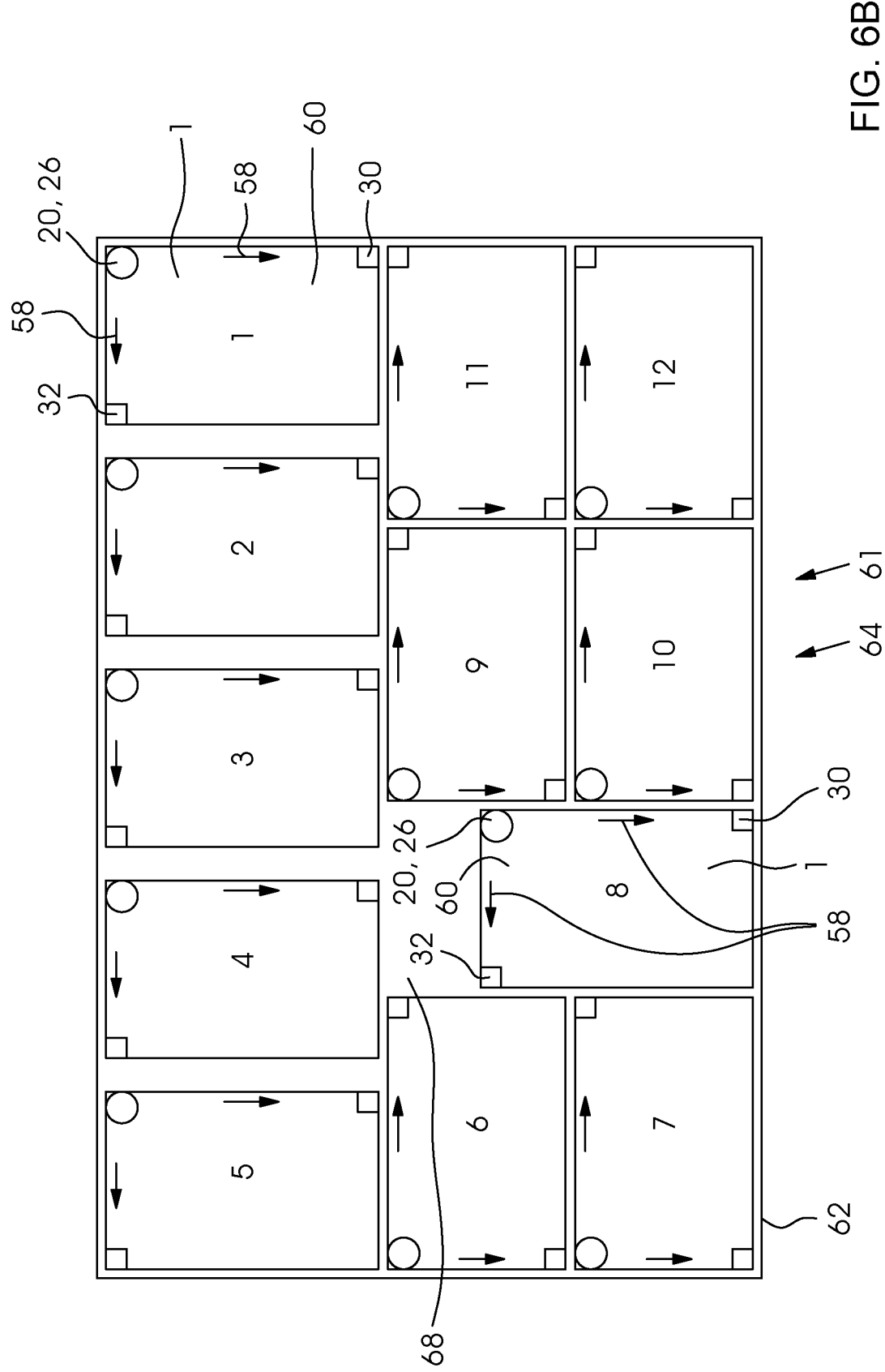

FIGS. 6A and 6B illustrate preferred exemplary embodiments of deposit schemes.

FIGS. 6A and 6B are top views of an example of twelve stacks 1 of products. They were deposited in an order from stack 1 to stack 12.

At a respective corner of every stack of products, the gripping device 20/flange 26 is shown as a circle. At two respective corners, the two grippers 30 and 32 are shown. Each one of arrows 58 indicates the directions into which the opened grippers are moved to release the stack of products.

Depositing the stacks 1 of products at the deposit positions 60 in accordance with the selected deposit scheme 61 allows the grippers 30 and 32 to move in the horizontal without colliding with stacks of products that have already been deposited before.

As shown in FIGS. 6A and 6B, what is referred to as a "chimney" 68, an empty space in the deposit scheme, may be created.

A comparison between FIGS. 6A and 6B shows that the deposit scheme may change. The deposit scheme is preferably changed in every new horizontal plane/layer of a transport stack to be formed. This improves the stability of the transport stack.

FIG. 7 illustrates a preferred exemplary embodiment of a transport stack created by the steps of "depositing". The figure is a lateral view.

A first layer 63 of stacks 1 of products has been deposited on a transport pallet 62 in accordance with a first deposit scheme. On top of it, an intermediate layer 67 has been deposited. The robot may take intermediate layers off of a neighboring stack of intermediate layers. Suction grippers 36 may be used for this purpose. A second layer 63 of stacks 1 of products is deposited on the intermediate layer in accordance with the second deposit scheme, which is preferably different from the first deposit scheme. As it can be seen, the edges of the stacks of products 1 may be horizontally offset 69 relative to one another. This improves the stability of the transport stack.

As the gripping device 20 approaches the transport stack 64, the sensor 66 may measure the vertical distance 65 and the digital computer 80 may use the measured value to control the collision-free movement of the gripping device.

Figure 8:
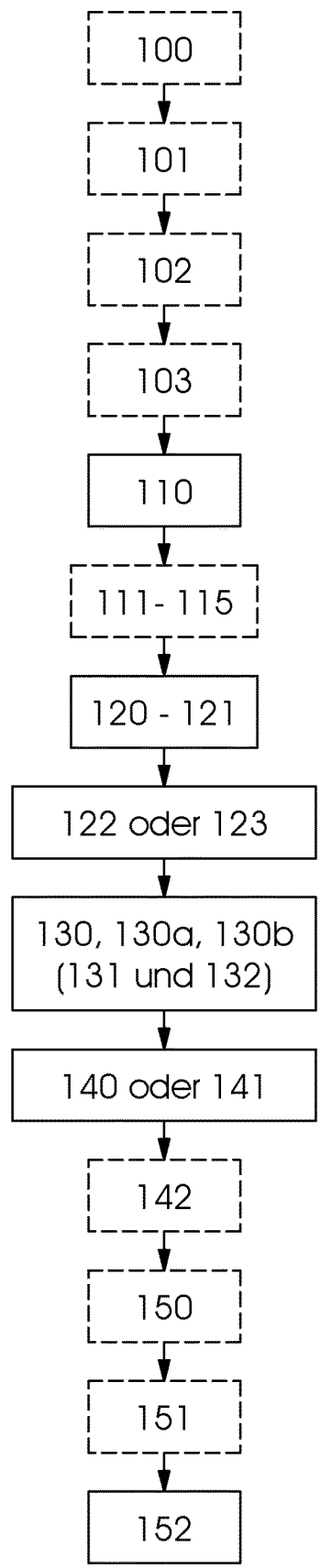
FIG. 8 is a flowchart illustrating an embodiment of the method according to the invention.

FIG. 8 illustrates a preferred exemplary embodiment of a flow chart. Optional steps are indicated by dashed lines.

The processing step (100) may comprise the manufacturing of folded products 2.

The transporting step (101) may comprise the transportation of stacks 1 of products into a direction of transport 71.

The separating step (102) may comprise the separation of stacks 1 of products in the direction of transport 71.

The stopping step (103) may comprise the stopping of the stack 1 of products at a pivoting device 40.

The pivoting step (110) may comprise a pivoting of the stack 1 of products 1 by means of a pivoting device 40, in particular through an angle α1=90°.

The aligning step (111) may comprise an alignment of the stack of products, preferably about a vertical axis. Alignment elements 41 may be used for this purpose.

The step of straightening (112) may comprise a straightening of the products 2. A straightening element 42 may be used for this purpose.

The vibrating step (113) may comprise a vibration of the stack 1 and consequently of the products 2.

The aerating step (114) may comprise an aeration of the stack 1 of products. The aeration may be attained by the vibration.

The modifying step (115) may transform a fanned-out stack of products 1 into an unfanned stack of products. Alignment elements 41 may be used for this purpose. Each one of them may be formed by a surface such as a plate with two chamfers.

The takeover step (120) may be done by the gripping device 20 and in particular the grippers 30 and 32 thereof. In the takeover, the stack of products may be transferred from the pivoting device 40 to the gripping device 20. The takeover may occur from side 3 or from side 4.

The holding step (121) may be done by the closed grippers 30 and 32.

The forward pivoting step (122) may be done by the robot arm 11, in particular through a2=90°.

The back pivoting step (123) may be done by the robot arm 11, in particular through
α2=−90°.

Further pivoting or back pivoting are preferably selected as a function of the deposit scheme.

The moving step/movement (130) is preferably done using the robot 10.

The partial moving step/movement portion (130a) and the partial moving/movement portion (130b) are preferably done using the robot 10.

The calculating step (131) is preferably done using the digital computer 80. The movement of the robot 10 may be calculated.

The controlling step (132) is preferably done using the digital computer 80. The movement of the robot 10 may be calculated.

The turning step (140) may be done by the robot arm 11, in particular through a1+a2=180°.

The non-turning step (141) may be done by the robot arm 11, in particular through a1+a2=0°.

The rotating step (142) may be done by the robot arm 11.

The step of letting sag (150) may be attained due to an adjustable distance between the two grippers 30 and 32.

The measuring step (151) of measuring the distance 65 and/or height 65 may be done by the sensor 66.

The depositing/stacking step (152) may be done by the robot arm 11. In this process, a predefined deposit scheme 61 may in particular be taken into consideration.

The following is a summary list of reference symbols and the corresponding structure used in the above description of the invention:

1 stack of products
2 printed products, in particular folded printed products
3 side
4 opposite side
5 corners
6 diagonally opposite corners
7 diagonal
8 sagging diagonal
10 device, in particular robot
11 robot arm/articulated arm
12 axes
13 axis of rotation
14 pivot axis
15 movement/path
16 movement portion/path portion
20 gripping device
21 first support arm
22 first longitudinal direction
23 second support arm
24 second longitudinal direction
25 linear drive
26 flange
30 first gripper, in particular pliers-type gripper
31 first pair of gripper jaws
31a immovable gripper jaw
31b movable gripper jaw
32 first gripper, in particular pliers-type gripper
33 second pair of gripper jaws
33a immovable gripper jaw
33b movable gripper jaw
34 support element, in particular support pad
35 stop elements, in particular two stop surfaces
36 further gripper, in particular suction gripper
37 linear drive
38 movement to open/close the grippers
39 blower device
40 pivoting device
41 alignment elements
42 straightening element
43 gripper
50 horizontal
51 horizontal axis
52 horizontal position
53 horizontal plane
54 vertical
55 vertical axis
56 vertical position
57 vertical plane
58 two directions perpendicular to one another
60 deposit position
61 deposit scheme
62 base, in particular pallet
63 position of already deposited stacks of products
64 transport stack
65 height
66 sensor, in particular distance sensor or camera
67 intermediate layer
68 chimney
69 offset
70 machine for further processing, in particular folder
71 direction of transport
72 delivery
73 protected zone
74 position of a machine for further processing
75 drives
76 rollers
80 digital computer
81 network
100 processing step 101 transporting step
102 separating step
103 stopping step
110 pivoting step
11 aligning step
112 straightening step
113 vibrating step
114 aerating step
115 changing step
120 takeover step
121 holding step
122 step of further pivoting
123 step of pivoting back
130 moving step/movement
130a partly moving step/movement portion
130b partly moving step/movement portion
131 calculating step
132 controlling step
140 turning step
141 step of not turning
142 rotating step
150 step of letting sag
151 measuring step
152 depositing/stacking step
α1 (first) effective angle
α2 (second) effective angle

The invention claimed is:

1. A method of moving a stack of products, the method comprising:
providing a robot with an articulated arm and two grippers disposed on the articulated arm;
the grippers being configured for gripping the stack of products and selectively turning the stack of products;
using the two grippers to deposit the stack of products and subsequently opening the grippers in a Z-direction and removing one of the grippers from the stack of products in an X-direction and another of the grippers in a Y-direction.

2. The method according to claim 1, which comprises, upon depositing the stack of products, opening the grippers in a vertical direction.

3. The method according to claim 2, which comprises moving a gripper jaw of one or both of the two grippers.

4. The method according to claim 2, which comprises not moving a gripper jaw of one or both of the two grippers.

5. The method according to claim 1, which comprises:
moving multiple stacks of products and thereby moving each of the stacks of products to a respective deposit position of a predefined deposit scheme;
selecting the respective deposit position in such a way that in the selected deposit position, the grippers are horizontally removed from the stack of products without colliding with stacks of products that have already been deposited.

6. The method according to claim 1, which comprises pivoting the stack of products through an effective angle α1 that is different from 180° and subsequently pivoting through an effective angle α2=180°−α1 or pivoting back through an effective angle α2=−α1.

7. The method according to claim 5, which comprises terminating the moving step at a selected deposit position among multiple deposit positions of a predefined deposit scheme.

8. The method according to claim 1, wherein the stack of products is a stack of printed products.

* * * * *